(12) United States Patent
Filippi et al.

(10) Patent No.: US 9,950,928 B2
(45) Date of Patent: Apr. 24, 2018

(54) PROCESS FOR PRODUCING AMMONIA SYNTHESIS GAS

(71) Applicant: Casale SA, Lugano (CH)

(72) Inventors: Ermanno Filippi, Castagnola (CH); Raffaele Ostuni, Lugano (CH)

(73) Assignee: Casale SA, Lugano (CH)

(*) Notice: Subject to any disclaimer, the term of this patent is extended or adjusted under 35 U.S.C. 154(b) by 0 days.

(21) Appl. No.: 15/104,448

(22) PCT Filed: Dec. 16, 2014

(86) PCT No.: PCT/EP2014/077882
§ 371 (c)(1),
(2) Date: Jun. 14, 2016

(87) PCT Pub. No.: WO2015/091430
PCT Pub. Date: Jun. 25, 2015

(65) Prior Publication Data
US 2016/0311680 A1    Oct. 27, 2016

(30) Foreign Application Priority Data
Dec. 20, 2013    (EP) .................................... 13198994

(51) Int. Cl.
*C01B 3/02* (2006.01)
*B01J 7/02* (2006.01)
*B01J 19/00* (2006.01)

(52) U.S. Cl.
CPC ................ *C01B 3/025* (2013.01); *B01J 7/02* (2013.01); *B01J 19/0046* (2013.01);
(Continued)

(58) Field of Classification Search
CPC ................ C01B 3/02; C01B 2203/143; C01B 2203/141; C01B 2203/1241; C01B 3/382;
(Continued)

(56) References Cited

U.S. PATENT DOCUMENTS

| 4,296,085 | A | * | 10/1981 | Banquy | ................... C01B 3/025 252/373 |
| 2009/0105356 | A1 | | 4/2009 | Bormann et al. | |
| 2010/0199682 | A1 | * | 8/2010 | Fischer | ................... C01B 3/382 60/780 |

FOREIGN PATENT DOCUMENTS

| EP | 2 065 337 A1 | 6/2009 |
| EP | 2 404 869 A1 | 1/2012 |

(Continued)

OTHER PUBLICATIONS

International Search Report issued in connection with PCT/EP2014/077882.

(Continued)

*Primary Examiner* — Anthony J Zimmer
*Assistant Examiner* — Syed Iqbal
(74) *Attorney, Agent, or Firm* — Akerman LLP

(57) ABSTRACT

A process and a related equipment for producing ammonia synthesis gas from a hydrocarbon-containing feedstock (20), the process comprising the steps of: primary reforming with steam (21), secondary reforming with an oxidant stream (23), and purification of the effluent of said secondary reforming, said purification comprising a step of shift conversion (13) of carbon monoxide, wherein the synthesis gas (25) produced by said secondary reforming is subject to a medium-temperature shift over a copper-based catalyst, and the global steam to carbon ratio of the process is not greater than 2.

16 Claims, 3 Drawing Sheets

(52) U.S. Cl.
CPC .............. *B01J 2219/0059* (2013.01); *B01J 2219/00756* (2013.01); *C01B 2203/0233* (2013.01); *C01B 2203/0244* (2013.01); *C01B 2203/0283* (2013.01); *C01B 2203/043* (2013.01); *C01B 2203/046* (2013.01); *C01B 2203/048* (2013.01); *C01B 2203/143* (2013.01)

(58) Field of Classification Search
CPC ........ C01B 2203/061; C01B 2203/127; C01B 2203/068; C01B 2203/0233; C01B 2203/0244; C01B 3/025; C01B 2203/043; C01B 2203/048; C01B 2203/046; C01B 2203/0283; B01J 2219/0059; B01J 19/0046; B01J 7/02; B01J 2219/00756
See application file for complete search history.

(56) References Cited

FOREIGN PATENT DOCUMENTS

| EP | 2404869 A1 * | 1/2012 | ............ C01B 3/025 |
|----|--------------|--------|------------------------|
| WO | 2010/020309 A1 | 2/2010 | |
| WO | WO 2010020309 A1 * | 2/2010 | ............ C01B 3/382 |

OTHER PUBLICATIONS

International Preliminary Report on Patentability issued in connection with PCT/EP2014/077882.

* cited by examiner

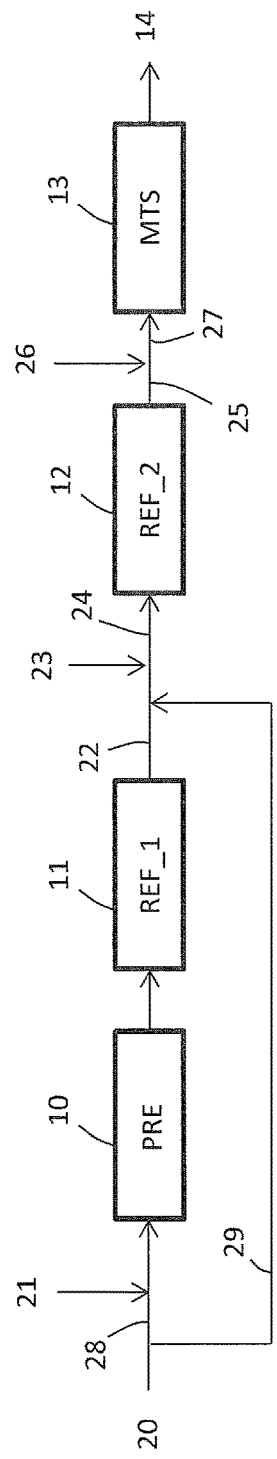
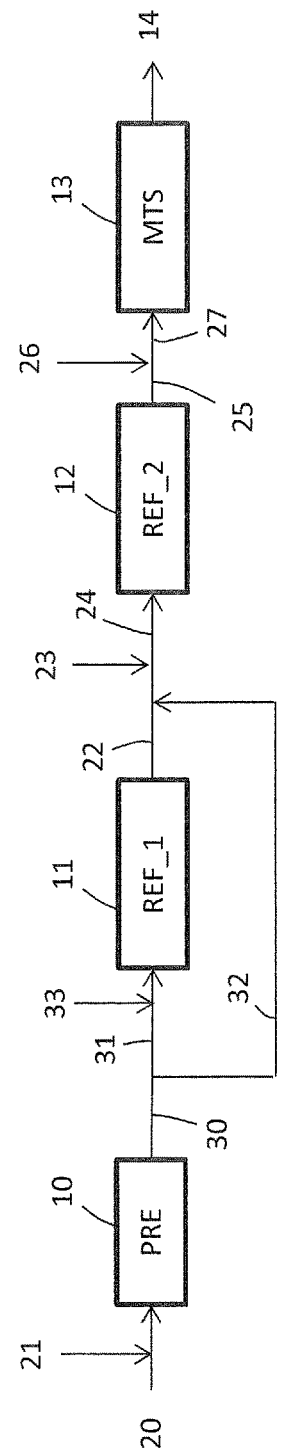
FIG 2
FIG 3

PROCESS FOR PRODUCING AMMONIA SYNTHESIS GAS

This application is a national phase of PCT/EP2014/077882, filed Dec. 16, 2014, and claims priority to EP 13198994.9, filed Dec. 20, 2013, the entire contents of both of which are hereby incorporated by reference.

FIELD OF THE INVENTION

The invention relates to reforming of hydrocarbons for the preparation of a synthesis gas, also named syngas, for the production of ammonia.

PRIOR ART

The synthesis of ammonia ($NH_3$) requires a synthesis gas comprising hydrogen ($H_2$) and nitrogen ($N_2$) in a suitable ratio of about 3:1. The term ammonia syngas will be used with reference to a synthesis gas with the above composition.

It is known to produce said syngas from the reforming of a hydrocarbon (HC) feedstock containing methane. Reforming takes place in a primary reformer and then in a secondary reformer. Usually, the feedstock and a suitable amount of steam are admitted into a primary reformer, where methane is converted in a mixture of carbon monoxide, carbon dioxide and hydrogen by passage over a suitable catalyst; the secondary reformer receives the gas product delivered by the primary reformer, and an air flow. The reformed gas leaving the secondary reformer is then purified in a shift conversion section, a CO2 removal section and a methanation section.

U.S. Pat. No. 4,296,085 discloses a process for producing ammonia from a desulfurized hydrocarbon containing feedstock available at a pressure of at least 30 bars, comprising: dividing said feedstock into two fractions; subjecting only the first fraction from to a primary steam reforming reaction; combining the gaseous effluent from said primary steam reforming with the second fraction of the feedstock; reacting the mixture in a secondary reforming reactor. Purification takes place in a high-temperature shift converter with iron-based catalyst and then in a low-temperature shift converter.

Further background art of production of ammonia synthesis gas can be found in EP 2 065 337.

A relevant parameter of the reforming process in the molar steam to carbon ratio, that is the ratio between the moles of carbon introduced with the hydrocarbon feedstock and the moles of steam.

The most common prior art is to operate the primary reformer with a high steam to carbon ratio, that is greater than 2.6 and usually in the range 2.8-3.5, to avoid damage of the iron-based catalyst of the HTS converter.

EP 2 404 869 discloses: a process for producing ammonia synthesis gas from a hydrocarbon-containing feedstock, the process comprising the steps of primary reforming said feedstock with steam, secondary reforming with an oxidant stream, and further treatment of the synthesis gas involving at least shift, removal of carbon dioxide and methanation, wherein the synthesis gas produced by said secondary reforming is subject to a medium-temperature shift at a temperature between 200 and 350° C., and said primary reforming is operated with a steam-to-carbon ratio lower than 2.

By lowering the steam to carbon ratio, the amount of gas processed in the primary reformer can be increased. However, the need to compensate by introduction of enriched air or oxygen in the secondary reformer may negatively balance the above advantage, due to the higher investment cost of the relevant air separation unit. More generally, there is a continuous incentive to reduce the size and cost of expensive equipment like the secondary reformer and the air separation unit.

SUMMARY OF THE INVENTION

The purpose of the invention is to overcome the above drawbacks.

Said purpose is reached with a process according to claim 1. The process comprises the steps of primary reforming said feedstock with steam, secondary reforming with an oxidant stream, and further treatment of the synthesis gas involving at least shift and removal of carbon dioxide, and is characterized in that the synthesis gas produced by said secondary reforming, optionally added with steam, is subject to a medium-temperature shift over a copper-based catalyst, and the global steam to carbon ratio of the process is not greater than 2.

The global steam to carbon ratio is determined by the total amount of the moles of steam over the moles of carbon introduced with the feedstock.

According to a preferred embodiment of the invention, steam is added in multiple stages of the process. A first amount of steam is added before the primary reforming (possibly including a pre-reforming step), and a second amount of steam is added before the medium-temperature shift conversion.

The medium-temperature shift conversion is preferably isothermal, which means that heat is removed by a suitable heat exchanger immersed in the catalyst. The catalyst is preferably a copper-zinc catalyst. The temperature of the shift conversion is preferably in the range 200 to 300° C. and more preferably around 250° C.

Oxydant stream for the secondary reforming may include air, oxygen-enriched air or substantially pure oxygen. The substantially pure oxygen is understood as oxygen as obtainable from an air separation unity, and has preferably a purity equal to or greater than 95%.

In some embodiments, the primary reforming section is operated with a low steam to carbon ration of 0.5 to 1.5. A low ratio, that is less than 1 and possibly around 0.5, can be adopted especially in embodiments with a pre-reformer. Then, the subsequent introduction of steam before the shift conversion helps to convert the carbon monoxide and produce hydrogen as desired.

In some embodiments, a portion of the hydrocarbon feedstock is made to by-pass the primary reforming stage or (when provided) the pre-reforming stage. Said bypass provides an additional degree of freedom in determining the local steam to carbon ratio, for example a primary reforming stage by-passed by some of the feedstock is brought to operate under a high ratio such as 2.5 to 3, while the global ratio is kept at a value of 2 or lower.

Some preferred embodiments are in accordance with the attached claims.

The invention provides embodiments with or without a pre-reforming. According to some embodiments, a fraction of the feedstock bypasses the primary reforming section, either with or without a pre-reforming.

In some embodiments including a pre-reforming, the feedstock is divided into two fractions. A first fraction is directed to the pre-reforming and primary reforming, and a second fraction by-passes both the pre-reforming and primary reforming and is fed to the secondary reforming together with the effluent of primary reforming. In some other embodiments, the effluent of the pre-reforming stage is divided into two fractions, a first fraction is directed to the primary reforming step and a second fraction bypasses said pre-reforming step and is rejoined with the effluent thereof. A further amount of steam can be optionally added to said first fraction.

The primary reforming stage is preferably operated with a steam to carbon ratio of 1 to 1.5. In embodiments with a pre-reformer, said pre-reformer can be operated at a lower steam to carbon ratio, as low as 0.5.

More in detail, some preferred embodiments are as follows.

In a first embodiment, a pre-reformer and a primary reformer are operated at low S/C ratio of 1 to 1.5. Steam is added upstream the MTS to reach an overall S/C of about 2 and improve the conversion of CO on the MTS catalyst.

In a second embodiment, some of the feedstock by-passes around the pre-reformer and reformer. The feedstock from the by-pass is added at the inlet of a secondary reformer or autothermal reformer with little or no steam, to reduce the S/C ratio in the reforming area. Additional steam is introduced upstream MTS but to a low overall S/C of about 2, to improve the conversion of CO. The amount of additional steam depends on the amount of natural gas bypassed around the reformer.

In a third embodiment, some of the feedstock, preferably at least 40-50%, by-passes around a primary steam reformer, operated at S/C ratio of about 2.7-3, which can be done without a pre-reformer. Steam is added upstream the MTS but to a low overall S/C ratio of about 2.

In a fourth embodiment, all the incoming feedstock is pre-reformed at low S/C ratio of 0.5 to 1.5, then some of pre-reformed gas by-passes the primary reformer. Steam is added upstream the primary reformer and upstream the MTS, but to a low overall S/C ratio of less than 2.

All the embodiments of the invention may include steps of carbon dioxide removal and optionally of methanation.

Further process steps may be provided to purify the synthesis gas, in particular to remove methane, unreacted hydrocarbons or inert gases. Said further steps may include any of: cryogenic separation, pressure-swing adsorption, or equivalent. In some embodiments, Inert gases and methane can be removed from the purge gas taken from the synthesis loop, with a known treatment such as for example a cryogenic process.

The advantages of the invention include a reduced size of cost-intensive equipment including the reformers, the related piping which operates under high temperature and pressure, and the air separation unit which provides oxygen-enriched air or pure oxygen. The invention provides a better and optimized exploitation of the various sections, thanks to the fact that the steam to carbon ratio can be locally modified, e.g. featuring a pre-reformer with a low ratio or a primary reformer with a higher ratio, while the global ratio is kept at a desired value by means of the addition of steam before the medium-temperature shift stage.

The invention also includes a plant for the production of ammonia syngas and a procedure for revamping an ammonia plant, according to the attached claims.

An aspect of the invention is a procedure for revamping of an ammonia plant comprising a front-end for production of a ammonia synthesis gas, and a synthesis loop for reaction of said synthesis gas into ammonia, said front-end comprising at least a primary steam reformer, a secondary reformer, a high-temperature shift converter, said procedure comprising at least the steps of: replacing said shift converter with a medium-temperature shift converter with copper-based catalyst, or modifying the existing high-temperature shift converter for operation at medium temperature and with a copper-based catalyst; regulation of said steam line and other steam lines of the plant, if any, in such a way that the revamped plant operates with a global steam to carbon ratio which is not greater than 2.

Preferably, said procedure comprises also: the provision of at least one steam line arranged to feed steam to the effluent of the secondary reformer, before admission to the shift converter.

In some embodiments, the procedure comprises also the provision of a bypass line around the primary reforming section, for a portion of feedstock. In some other embodiments, the procedure comprises the provision of a bypass line around a primary reformer, for a portion of the effluent of a pre-reformer upstream the primary reformer.

The procedure of revamping according to the invention involves passing from high-temperature shift (HTS) to medium-temperature shift (MTS). This can be done by replacing an existing HTS reactor with a medium-temperature shift reactor, or modifying the HTS reactor for operation at medium temperature and with the appropriate catalyst.

The medium-temperature shift reactor is preferably isothermal. Then, the revamping may involve for example one of the following alternatives:
  i) keeping the existing vessel of the HTS reactor, replacing the high temperature catalyst with a medium temperature catalyst, such as Cu—Zn catalyst, and providing the vessel with an internal heat exchanger, immersed in the catalyst, or
  ii) installing a new MTS reactor with a suitable catalyst and internal heat exchanger.

In both the above options, the heat exchanger is preferably a plate heat exchanger.

In some embodiments, a pre-reforming section is also added upstream an existing primary steam reformer.

According to preferred embodiments, the procedure may further comprise the increasing of the amount of oxygen directed to a secondary reformer, by any of the following measures: a) feeding excess air to said secondary reformer; b) providing enrichment of air fed to the secondary reformer; c) feeding substantially pure oxygen to the secondary reformer. To achieve the aforesaid measures the revamping of the plant may provide that: a) the existing air feed to the secondary reformer is modified to provide a larger air input, or b) a suitable equipment for air enrichment is installed, or c) a suitable source of substantially pure oxygen is installed, if not available. Said steps may involve the modification or replacement of piping, valves, auxiliary equipments, etc . . . according to known art.

According to still further embodiments, further equipments for syngas purification may be installed, to provide any of the following: cryogenic separation of excess methane and/or nitrogen in the ammonia syngas; separation of excess nitrogen, if any, by an adsorption process such as PSA; increasing the purge loop form the synthesis loop, to provide removal of inert gases and residual methane.

An increase of capacity may be obtained without modifying the internals of the primary reformer if, further to provision of MTS reactor instead of the original HTS reactor, one or more of the following measures are taken:
  providing more oxygen to the primary reformer, by feeding excess air or enriched air or pure oxygen to said primary reformer,
  improving the purification of the syngas by one or more of the techniques listed above, i.e. cryogenic separation of excess methane and/or nitrogen in the ammonia syngas; separation of excess nitrogen by means of adsorption; increasing the purge of the synthesis loop.

Hence, the revamping procedure may include, when necessary, the installation of the related equipments, such as air separation unit for air enrichment or oxygen feed, cryogenic separator, PSA separation section. The method may include also the revamping of the syngas main compressor, synthesis reactor, and other equipments, to process the augmented flow rate of syngas delivered by the front-end.

It should also be noted that the syngas flow delivered by the revamped front end may contain less nitrogen than required to react the stoichiometric ratio 3:1 for synthesis of $NH_3$. In this case, the missing nitrogen may be furnished as a separate stream, which is added to the syngas preferably at suction side or delivery side of the main syngas compressor. Said nitrogen stream could be generated by an air separation unit.

BRIEF DESCRIPTION OF THE FIGURES

FIG. 2 is a scheme of a second embodiment of the invention.
FIG. 3 is a scheme of a third embodiment of the invention.

DETAILED DESCRIPTION OF A PREFERRED EMBODIMENT

Figure 1:
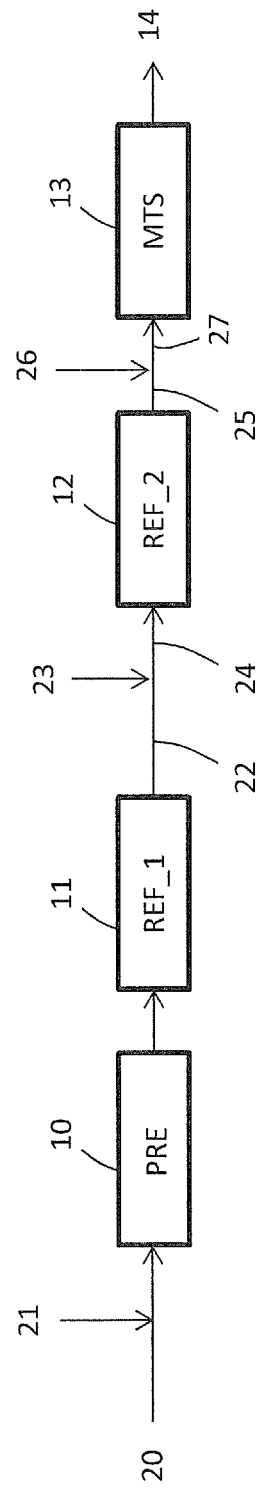
FIG. 1 is a scheme of a first embodiment of the invention.

FIG. 1 discloses a scheme of a front-end for generation of ammonia synthesis gas, comprising: a primary reforming section which includes a pre-reformer 10 and a primary reformer 11; a secondary reformer 12; a medium-temperature shift (MTS) converter 13. The pre-reformer, primary reformer and secondary reformer are also denoted by symbols PRE, REF_1 and REF_2.

The synthesis gas 14 leaving said MTS converter 13 is normally treated in a carbon dioxide removal section. In some embodiments, said gas 14 can be further treated in an optional low-temperature shift (LTS) section, before the step of carbon dioxide removal, to maximize the conversion of the carbon monoxide into $CO_2$. After carbon dioxide removal, the synthesis gas can be further purified by methanation or a cryogenic process. These steps are not described since they can be carried out with known techniques.

A feed 20 of a gaseous hydrocarbon feedstock such as desulphurized natural gas is mixed with a first amount of steam 21 and admitted to the pre-reformer 10. The effluent of said pre-reformer 10 passes to the primary reformer 11 and then the effluent 22 of said primary reformer 11 is added with oxygen-containing stream 23 to form the input stream 24 of the secondary reformer 12.

The effluent 25 of said secondary reformer 12 is added with a second amount of steam 26 to form the input stream 27 of the MTS converter 13.

The oxygen-containing stream 23 may be air, enriched air or substantially pure oxygen, according to various embodiments of the invention. In a preferred embodiment said stream 23 is oxygen with a purity of 95% or greater.

The effluent from the secondary reformer 12, which is usually at a temperature around 1000° C., is cooled in a recuperative heat exchanger (not shown) before admission to the MTS converter 13.

The MTS converter 13 may comprise one or more isothermal catalytic reactors, comprising a copper-based catalytic bed and a plate heat exchanger immersed in the catalytic bed.

In a preferred embodiment according to FIG. 1, the amount of feedstock 20 and of the first steam 21 is such to operate the pre-reformer 10 and the primary reformer 11 at a steam to carbon ratio of 1 to 1.5. The further addition of steam 26 brings the global steam to carbon ratio to a higher value which is however not greater than 2 according to the invention.

FIG. 2 shows an embodiment where the incoming feedstock 20 is divided into a first portion 28 and a second portion 29. Said second portion 29 by-passes the primary reforming section, that is the pre-reformer 10 and the primary reformer 11. Said second portion 29 of the feedstock is then re-joined with the effluent 22 of the primary reformer 11, before the admission to the secondary reformer 12.

The amount of additional steam 26, in this embodiment, depends on the amount of natural gas 29 bypassed around the primary reforming section: the larger the bypass stream 29, the larger the amount of steam 26.

FIG. 3 shows another embodiment with pre-reforming where the full amount of fresh feedstock 20 and steam 21 is fed to a pre-reformer 10; the effluent 30 of the pre-reforming is divided into two fractions 31 and 32. Only the first fraction 31 is fed to the primary reformer 11, while the second fraction 32 by-passes the primary reformer and is re-joined with the effluent thereof.

The first fraction 31 may be optionally added with an amount of steam 33 before admission to the primary reformer 11, to adjust the steam-to-carbon ratio. Hence, in this embodiment the pre-reformer 10 can run at a very low steam to carbon ratio. The steam to carbon ratio of the primary reformer 11 is regulated by the amount of bypass 32 and steam 33, while the global ratio is further adjusted by the steam 26.

Figure 4:
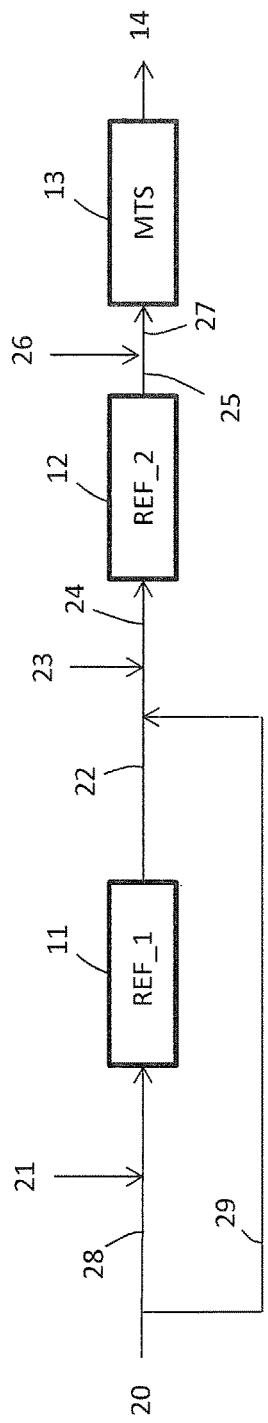
FIG. 4 is a scheme of a fourth embodiment of the invention.

FIG. 4 shows an embodiment without pre-reforming. A portion 29 of feedstock 20 by-passes the primary reformer 11 and is joined with its effluent 22. In some embodiments, the portion 29 is a relevant portion of the total amount of feedstock 20, such as 40% or more. Accordingly, the primary reformer 11 is operated at a high steam to carbon ratio (e.g. around 2.7) while the global ratio computing also the fraction 29 and the other steam input(s), such as the steam line 26, is not greater than 2.

Figure 5:
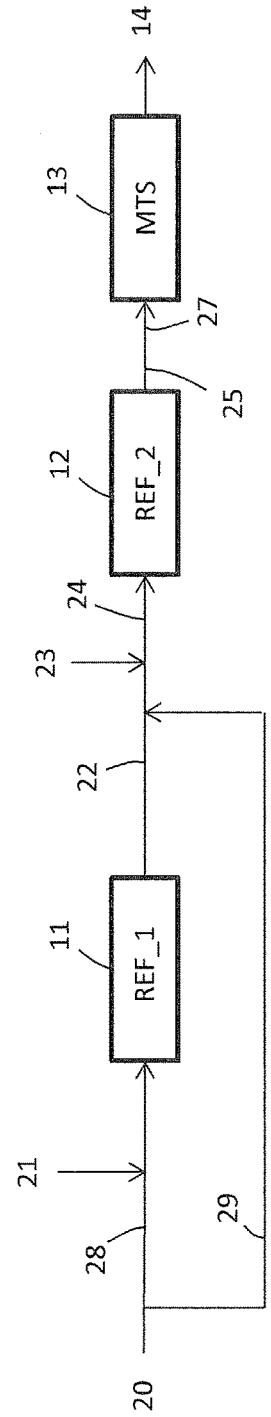
FIG. 5 is a scheme of a fifth embodiment.

FIG. 5 shows an embodiment without additional input of steam 26. Accordingly, all the steam enters via line 21 mixed with the feedstock 20. A portion of the feedstock 20 by-passes the primary reformer 11.

It should be noted that steam line 26 is an optional feature also in the embodiments of FIGS. 2, 3 and 4. The global steam-to-carbon ratio is not greater than 2, whilst the steam-to-carbon ratio in the primary reformer (possibly with a pre-reformer) may be higher due to the carbon by-pass of line 29 or 32.

The invention claimed is:
1. A process for producing ammonia synthesis gas from a hydrocarbon-containing feedstock, the process comprising the steps of:
   primary reforming with steam, secondary reforming with an oxidant stream, and purification of the effluent of said secondary reforming, said purification comprising a step of shift conversion of carbon monoxide, wherein:
   the synthesis gas produced by said secondary reforming is subject to a medium-temperature shift over a copper-based catalyst, and a fraction of the feedstock bypasses the primary reforming, the steam to carbon ratio in the primary reforming being 2.5 to 3, and/or steam is added in multiple stages of the process, wherein the global steam to carbon ratio of the process that is the total amount of the moles of steam over the moles of carbon introduced with the feedstock is not greater than 2.

2. The process according to claim 1, wherein the synthesis gas produced by said secondary reforming is added with steam, and the so obtained flow of synthesis gas added with steam is subject to said medium-temperature shift.

3. The process according to claim 1, said step of medium-temperature shift being carried out in an isothermal condition.

4. The process according to claim 3, said step of medium-temperature shift being carried out at a temperature in the range of 200 to 300° C.

5. The process according to claim 1, said oxidant stream being any of air, $O_2$-enriched air or pure oxygen.

6. The process according to claim 1, said oxidant stream being oxygen at a purity of 95% or greater.

7. The process according to claim 1, said primary reforming comprising a pre-reforming stage.

8. The process according to claim 7, and said primary reforming with pre-reforming stage being operated at a steam to carbon ratio between 1 and 1.5.

9. The process according to claim 7, wherein the feedstock is divided into a first fraction and a second fraction, said first fraction being directed to the pre-reforming and primary reforming, and said second fraction by-passes the primary reforming step and is rejoined with the effluent of the primary reforming, before admission to the secondary reforming.

10. The process according to claim 7, wherein the effluent of the pre-reforming stage is divided into two fractions, a first fraction is directed to the primary reforming step and a second fraction bypasses said primary reforming step and is rejoined with the effluent from said primary reforming step.

11. The process according to claim 10, wherein an amount of steam is added to said first fraction.

12. The process according to claim 10, said pre-reforming stage being operated at a steam to carbon ratio of 0.5 to 1.5.

13. The process according to claim 1, said primary reforming being carried out with no pre-reforming stage.

14. The process according to claim 13, wherein a portion of the feedstock bypasses said primary reforming, said portion being preferably 40% of more of the feedstock.

15. The process according to claim 14, wherein said primary reforming is carried out at a steam to carbon ratio of 2.7 to 3.

16. The process according to claim 1, further comprising the step of purification of the synthesis gas after the medium-temperature shift, including one or more of the following: a low-temperature shift, carbon dioxide removal, cryogenic separation, or a treatment step of adsorption, preferably pressure swing adsorption.

* * * * *